Figure 1:
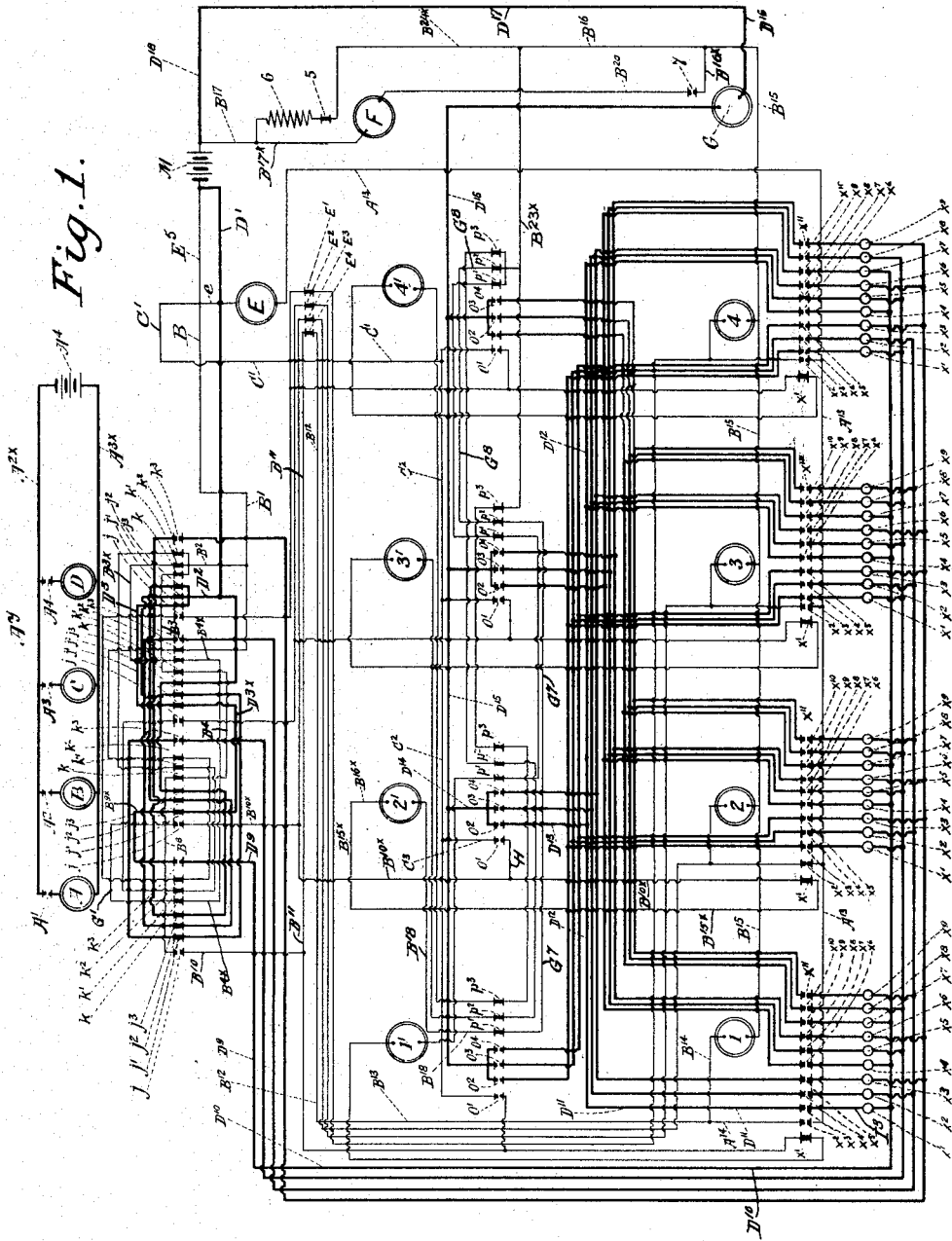

G. A. CARDWELL.
SYSTEM OF DISTRIBUTING ELECTRIC ENERGY.
APPLICATION FILED DEC. 4, 1913.

1,201,145.

Patented Oct. 10, 1916.
3 SHEETS—SHEET 1.

Witnesses:
John E. Prayer
A. Worden Gibbs

Inventor
George A. Cardwell
By his Attorney
Conrad A. Dieterich

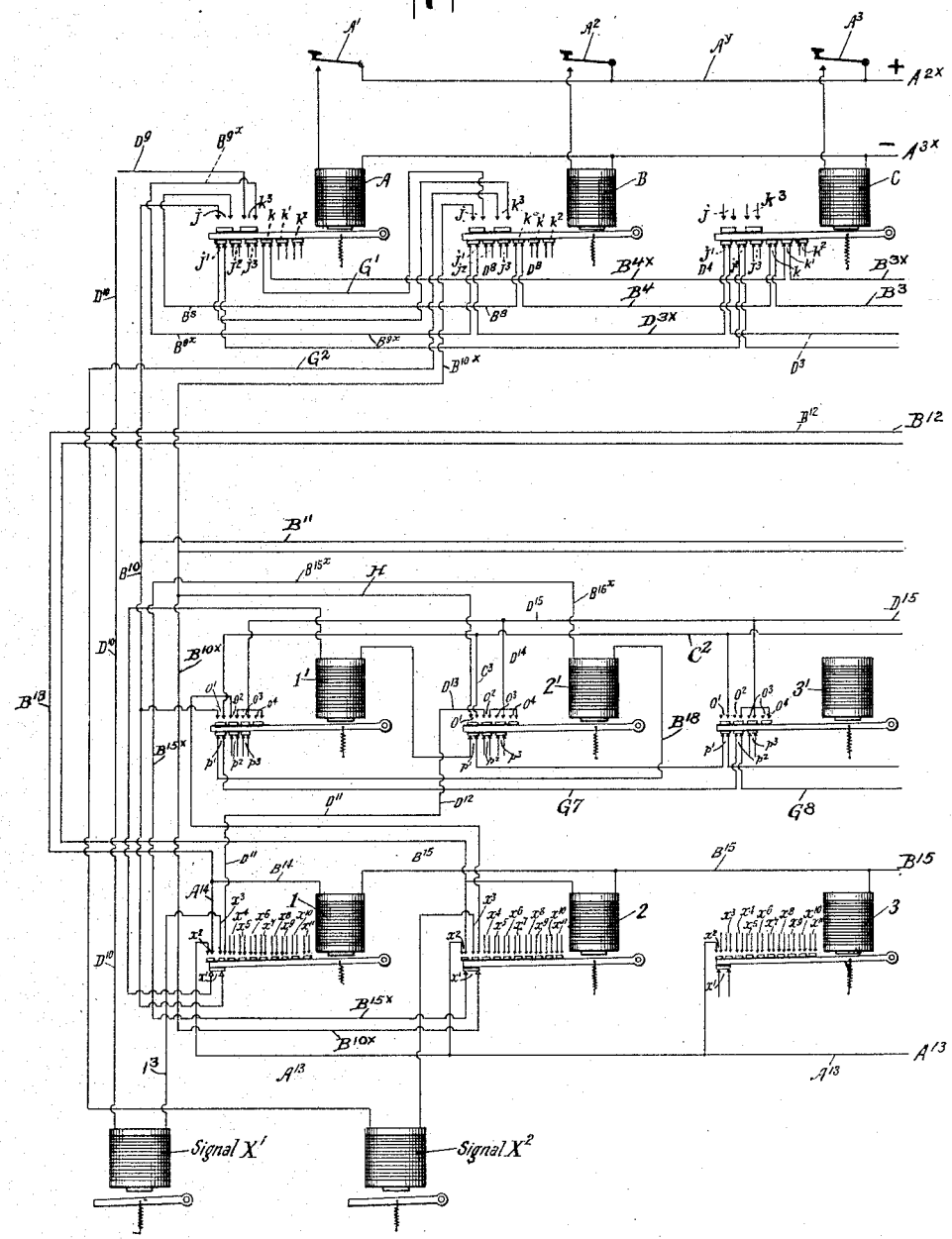

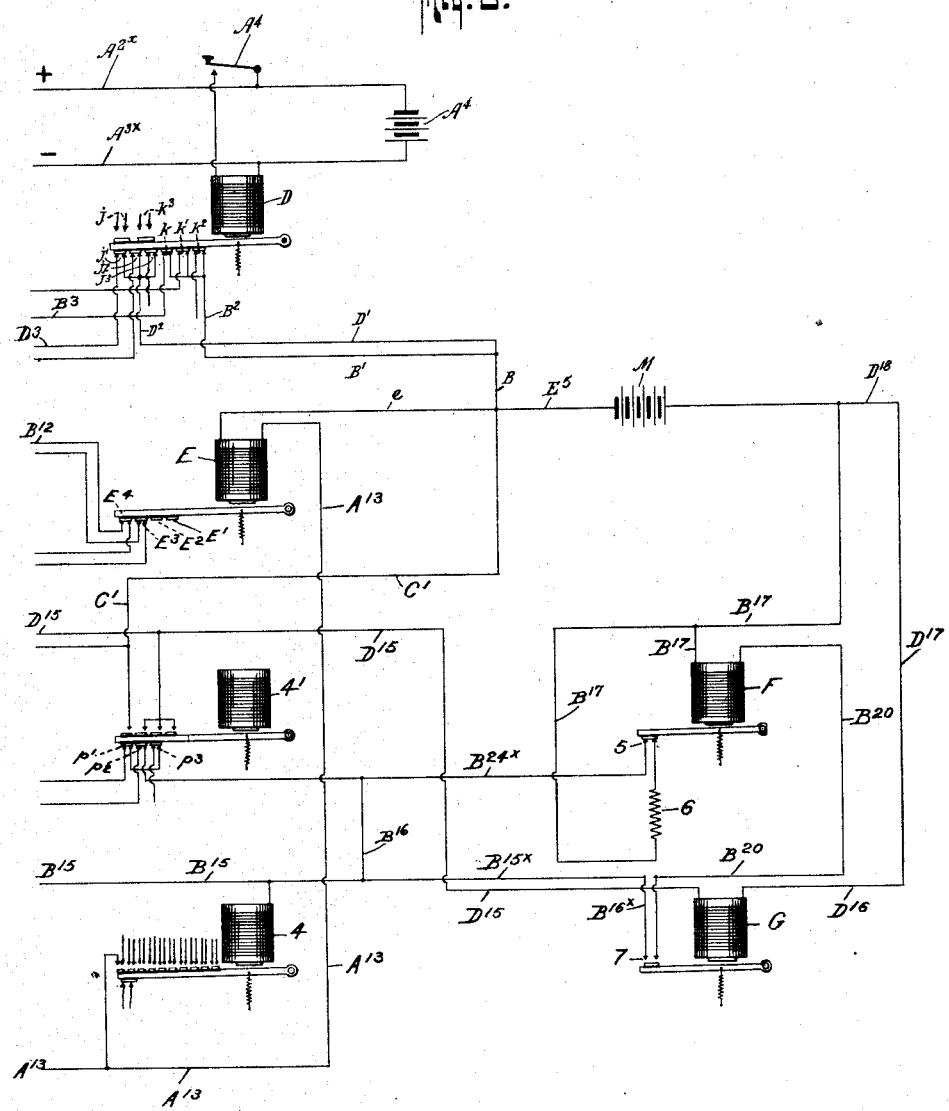

UNITED STATES PATENT OFFICE.

GEORGE A. CARDWELL, OF NEW YORK, N. Y., ASSIGNOR TO NATIONAL ELECTRIC DISTRIBUTER CORPORATION, OF WILMINGTON, DELAWARE, A CORPORATION OF DELAWARE.

SYSTEM OF DISTRIBUTING ELECTRIC ENERGY.

1,201,145.   Specification of Letters Patent.   Patented Oct. 10, 1916.

Application filed December 4, 1913. Serial No. 804,568.

*To all whom it may concern:*

Be it known that I, GEORGE A. CARDWELL, a citizen of the United States, residing in the city of New York, borough of Brooklyn, county of Kings, and State of New York, have invented certain new and useful Improvements in the Systems of Distributing Electric Energy, of which the following is a full, clear, and exact specification.

My invention relates to a system of distributing electric energy, and the same has for its object more particularly to provide a simple, efficient and positive means wherein by the permutation of a minimum number of circuit closing devices, a maximum number of apparatus such as signals, electric devices, or electro-mechanical devices may be severally selectively operated or controlled from a central or sending station.

To the attainment of the aforesaid objects and ends, my invention consists in the novel combination and arrangement of several series of circuits and the arrangement of several primary circuit closing devices and operating magnets actuated thereby, which serve to operate or control the device or apparatus ultimately operated by the several primary circuit closing devices.

In the accompanying drawings forming part of this specification wherein like numerals of reference indicate like parts Figure 1 is a diagrammatic view showing the distributing system; four circuit closing devices being shown with the necessary connections for actuating the thirty-six operating working magnets or signal devices, and Figs. 2 and 3 jointly, constitute a diagrammatic view showing two of the circuit closing devices, and the operating magnets or signals to be actuated thereby, together with their necessary connections. In said Figs. 2 and 3, only so much of the apparatus and connections are shown as are necessary to actuate the two working magnets or signals.

In the said drawings I have shown at Fig. 1 in diagram a circuit system comprising a main circuit having four circuit closing devices, four selecting circuits, each controlled by a number of circuit closing devices in said main circuit, a holding circuit for maintaining one or more of said selecting circuits closed as the remainder thereof are held open, and four impulse or operating circuits, each including nine operating magnets which operate or control the apparatus finally to be selectively actuated. Three operating magnets of each operating circuit being controlled by one of the circuit closing devices of the main circuit.

In the accompanying drawings I have shown my invention as in connection with four groups of circuits, controlled by four main circuit closers by means of which thirty-six operating magnets may be controlled or energized. It will be understood, however, that any number of groups may be provided, and that I have merely shown four groups herein by way of illustration. Each of the said thirty-six operating magnets individually controls an apparatus or mechanism which may be located in close proximity to said operating magnet or at any desired distance therefrom.

In said drawing $A^y$ designates the main circuit comprising a local battery $A^4$, conductors $A^{2x}$, $A^{3x}$, magnets A, B, C, D, each having one terminal connected to the conductor $A^{3x}$, and its other terminal connected to the conductor $A^{2x}$, and controlled by main circuit closers $A'$, $A^2$, $A^3$, $A^4$, which may be operated locally by hand. Each of the main circuit closers $A'$, $A^2$, $A^3$, $A^4$ controls a group of four preliminary circuits, and a group of four working circuits. Each of said four working circuits comprises three normally closed contacts $j'$, $j^2$, $j^3$, and the normally open contacts $j$, and said preliminary circuit includes three normally closed contacts $k$, $k'$, $k^2$, and the normally open contacts $k^3$. As the circuit closer $A'$ is operated it will cause the magnet A to be energized which will open the normally closed contacts $j'$, $j^2$, $j^2$, $k$, $k^1$, $k^2$, and close the normally open contacts $j$, $k^3$. The preliminary circuits of each of said four groups severally include the selecting magnets 1, 2, 3, 4 respectively, each of which selecting magnets controls the operation of nine working magnets $X'$, $X^2$, $X^3$, $X^4$, $X^5$, $X^6$, $X^7$, $X^8$, $X^9$, inclusive, through contacts $x'$ to $x^{11}$ inclusive. The contacts $x^2$ to $x^{11}$ are normally open contacts and the contacts $x'$ are normally closed. Upon the first closing of the main circuit closer $A'$ the selecting magnet 1 is energized as hereinafter described as a result of which the normally closed contacts $x'$ are opened, and the normally open contacts $x^2$ to $x^{11}$ are closed.

The selecting magnets 1, 2, 3, 4 are severally held energized by a shunt circuit hereinafter described including the magnet E which when energized from the local battery M serves to open the four normally closed contacts $E'$, $E^2$, $E^3$, $E^4$, thereby breaking the circuit connections between the main circuit-closers and the selecting magnets. Above the series of selecting magnets is arranged a series of four magnets $1'$, $2'$, $3'$, $4'$, which I term "second impulse" magnets, which are energized upon the second impulse, viz. after the circuit closer $A'$ has been actuated, when one of the remaining three main circuit closers $A^2$, $A^3$, $A^4$ is operated. By the closing, for example, of the circuit closer $A^2$, the normally closed contacts $j'$, $j^2$, $j^3$, $k$, $k'$, $k^2$ of the second group will be opened, and the normally open contacts $j$, $k^3$ of said second group closed and the magnet $2'$ will be energized as hereinafter described. By energizing the second impulse magnet $2'$ the four normally open contacts $o'$, $o^2$, $o^3$, $o^4$ of the second group are closed, and the three normally closed contacts $p'$, $p^2$, $p^3$ are opened.

Thus far the apparatus has only been operated to prepare a path for a working circuit. Each working circuit has in its battery return a magnet G which controls the normally open contacts 7 which serve, when closed, to shunt the preliminary circuit of any one of the four groups through a magnet F which controls the normally closed contacts 5 in circuit with a resistance 6. The operation of the magnets, circuit closers and contacts of each of said four groups, when the main circuit closer for any one of said groups is operated, is similar to that above described for groups one and two.

In order to energize any one of the working magnets three impulses are required, which impulses are caused by operating the main circuit-closers. The first impulse serves to select one of the groups of nine working magnets, the second impulse serves to select a group of three magnets from the thus selected group, and the third impulse serves to select one of the selected group of three magnets. By way of example, I will describe the steps necessary to operate the working magnet $X'$ which is controlled by the magnet 1. In order to energize the magnet $X'$ it is necessary to operate the main circuit-closers $A'$, $A^2$ in the order $A'$, $A^2$, $A'$. In describing the various circuits references will be had to Figs. 2 and 3 of the drawings. The closing of the main circuit-closer $A'$ for the first impulse will energize the magnet A from the local battery $A^4$ through the conductors $A^{2x}$ and $A^{3x}$. The magnet A attracts its armature closing the contacts $j$, $k^3$, and opening the contacts $j'$, $j^2$, $j^3$, $k$, $k'$ and $k^2$. The flow of current from the local battery M is through the circuit $E^5$, B, $B'$, $B^2$, contacts $k$ of the fourth group, $B^3$, contacts $k$ of the third group, $B^4$, contacts $k$ of the second group, $B^8$, contacts $j$ of the first group, $B^{10}$, $B^{11}$, contacts $E^4$, $B^{12}$, $B^{13}$, $B^{14}$, magnet 1, $B^{15}$, $B^{16}$, $B^{24x}$, contacts 5, resistance 6, $B^{17}$, $D^{18}$, back to the battery M. As the magnet 1 is energized it attracts its armature and breaks the circuit at contacts $x'$, and closes contacts $x^2$ to $x^{11}$, inclusive. The closing of the contacts $x^2$ completes a circuit from the local battery M through which current will flow as follows:— $E^5$, $e$, magnet E, $A^{13}$, contacts $x^2$, $A^{14}$, $B^{14}$, magnet 1, $B^{15}$, $B^{16}$, $B^{24x}$, contacts 5, resistance 6, $B^{17}$, $D^{18}$, back to the battery M. The current in this circuit will maintain the magnet 1 energized, and will also energize the magnet E. By energizing the magnet E the four contacts $E'$, $E^2$, $E^3$, $E^4$ are opened, and as these contacts control the circuits of the selecting magnets, they cannot now be operated by any one of the main circuit-closers. After this impulse has been sent the circuit-closer $A'$ is opened allowing its armature to return to its normal position. The circuit-closer $A^2$ is now closed for the second impulse as a result of which the magnet B is energized which attracts its armature to open contacts $j$, $k^3$, of the second group, and to close the contacts $j'$, $j^2$, $j^3$, $k$, $k'$, and $k^2$ of this group. Current will now flow from the battery M through the circuit $E^5$, B, $B'$, $B^2$, contacts $k'$ of the fourth group, $B^{3x}$, contacts $k'$ of the third group, $B^{4x}$, contacts $k$ of the first group, $G'$, contacts $j$ of the second group, $B^{10x}$, contacts $x'$ of the second group, $B^{15x}$, $B^{16x}$, magnet $2'$, $B^{18}$, contacts $p'$ of the first group, $G^7$, contacts $p^2$ of the third group, $G^8$, contacts $p^2$ of the fourth group, $B^{23x}$, $B^{24x}$, contacts 5, resistance 6, $B^{17}$, $D^{18}$, back to the battery. The second impulse magnet $2'$ is now energized and attracts its armature thus closing contacts $o'$, $o^2$, $o^3$, $o^4$, and opening the contacts $p'$, $p^2$, $p^3$, thereby breaking the circuits of the second impulse magnets $1'$, $3'$, $4'$. The second impulse magnet $2'$ is maintained energized by current which passes from the battery M through the circuit $E^5$, $C'$, $C^2$, $C^3$, contacts $o'$ of the second group, H, $B^{10x}$, contacts $x'$ of the second group, $B^{15x}$, $B^{16x}$, magnet $2'$, $B^{18}$, contacts $p'$ of the first group, $G^7$, contacts $p^2$ of the third group, $G^8$, contacts $p^2$ of the fourth group, $B^{23x}$, $B^{24x}$, contacts 5, resistance 6, $B^{17}$, $D^{18}$, back to the battery. The first and second impulses serve to prepare a selective path for the current which is to operate the working magnet $X'$, and to prevent any of the magnets 1, 2, 3, 4 or the magnets $1'$, $2'$, $3'$ $4'$ from being affected by the closing of any one of the main circuit-closers. The main circuit-closer A' is then operated for the third impulse, thereby energizing the magnet A, and attracting its armature as hereinbefore described. Current will now pass from the battery M through the circuit D', $D^2$, contacts $j'$ of the fourth group, $D^3$, contacts $j'$ of the third group, $D^{3x}$, contacts $j'$ of the second group, $B^{9x}$, contacts $k^3$ of the first group, $D^9$, $D^{10}$, working magnet X' of the first group, $I^3$, contacts $x^3$ of the first group, $D^{11}$, $D^{12}$, $D^{13}$, contacts $o^2$ of the second group, which is now closed, $D^{14}$, $D^{15}$, magnet G, $D^{16}$, $D^{17}$, $D^{18}$, back to the battery. By means of the current flowing in this circuit the working magnet X' is energized and operated, and the magnet G is also energized to close the contacts 7 thereby closing the circuit through magnet F as follows: $E^5$, $e$, magnet E, $A^{13}$, contacts $w^2$ of the first group, $A^{14}$, $B^{14}$, magnet 1, $B^{15}$, $B^{16x}$, contacts 7, $B^{20}$, magnet F, $B^{17x}$, $B^{17}$, $D^{18}$ to the battery. The energizing of the magnet F opens the contacts 5, thus breaking the circuits through the magnets 1, 2' and E, whereupon the parts are restored to their normal position in readiness for the next operation.

The operation of the circuit closers A', $A^2$, as above described, constitutes what I designate herein as the signal A'—$A^2$—A', which results in the actuating of the operating magnet X' of the first group. By the permutation of the circuit closers A', $A^2$, $A^3$, $A^4$, the thirty-six operating magnets may be severally and selectively operated. For example, a closing of the circuit closers $A^3$, A', in the order $A^3$—A'—$A^3$ will operate the magnet $X^2$ of the third group, and the closing of the circuit closers, $A^4$, $A^3$, A' in the order named, will operate the magnet $X^7$ of the fourth group, and so on throughout the various permutations of which said four circuit closers A', $A^2$, $A^3$, $A^4$ are capable.

While I have shown all the operating magnets X' to $X^9$ inclusive, arranged in four groups and adapted to operate in a limited or compact area, it will nevertheless be obvious that the same may be separated from each other and located at widely distant points and still be operable from a single central or sending station.

Having thus described my invention, what I claim and desire to secure by Letters Patent is,—

1. In an electric distributing system the combination of a source of electric energy with a plurality of groups of working magnets, main circuit closers for operating said working magnets, selecting magnets for each of said groups of working magnets, second impulse magnets adapted to be severally energized after one of said selecting magnets has been energized and coöperating therewith to prepare a circuit from one of said main circuit closers to a predetermined working magnet, and holding circuits for maintaining energized the actuated selecting magnet and the actuated second impulse magnet until the said predetermined working magnet has been actuated, substantially as specified.

2. In an electric distributing system the combination of a source of electric energy with a series of groups of working circuits, a series of working magnets in circuit with each of said groups, a series of normally open contacts in circuit with said working magnets, a series of selecting circuits, a series of normally closed contacts in circuit therewith, a series of selecting magnets in circuit with said selecting circuits adapted severally to close the normally open contacts controlling said groups of working magnets, a series of holding circuits for severally maintaining energized the actuated selecting magnet upon the energization thereof, a magnet in circuit with said holding circuits for opening said normally closed contacts, a series of second impulse magnets co-acting with said selecting magnets to prepare a circuit to a pre-determined working magnet, a main circuit, a series of magnets connected therewith, circuit closers for actuating said magnets, and a plurality of series of contacts controlled thereby, whereby upon operating one of said circuit closers one of said selecting magnets will be actuated to close the normally open contacts of its associated group of working magnets and to close its associated holding circuit to energize said magnet to open said normally closed contacts, and whereby upon operating another of said circuit closers one of said second impulse magnets will be actuated to coöperate with said actuated selecting magnet to prepare a circuit from one of said circuit closers to said predetermined working magnet, substantially as specified.

3. In an electric distributing system the combination of a source of electric energy with a series of groups of working circuits, a series of working magnets in circuit with each of said groups, a series of normally open contacts in circuit with said working magnets, a series of selecting circuits, a series of normally closed contacts in circuit therewith, a series of selecting magnets in circuit with said selecting circuits adapted severally to close the normally open contacts controlling said groups of working magnets, a series of holding circuits for severally maintaining energized the actuated selecting magnet upon the energization thereof, a magnet in circuit with said holding circuits for opening said normally closed contacts, a series of second impulse magnets co-acting with said selecting magnets to prepare a circuit to a predetermined working magnet, a main circuit, a series of magnets connected therewith, circuit closers for actuating said magnets, a plurality of series of contacts controlled thereby, whereby upon operating one of said circuit closers one of said selecting magnets will be actuated to close the normally open contacts of its associated group of working magnets and to close its associated holding circuit to energize said magnet to open said normally closed contacts, and whereby upon operating another of said circuit closers one of said second impulse magnets will be actuated to coöperate with said actuated selecting magnet to prepare a circuit from one of said circuit closers to said predetermined working magnet, and means restoring the system to its initial condition after said predetermined working magnet has been actuated, substantially as specified.

4. In an electric distributing system the combination of a source of electric energy, with a plurality of groups of working magnets, a series of contacts for each group in circuit with said working magnets, a selecting magnet for each of said groups controlling the contacts for the working magnets of its respective group, a series of circuit closers corresponding in number to said selecting magnets for operating the same, a plurality of selecting circuits each having a normally closed contact therein, a magnet in circuit with said selecting magnets which serves to open said contacts to break said selecting circuits whereby when one of said selecting magnets is energized by the closing of its respective circuit closer, the energizing of the remainder of said selecting magnets is prevented, substantially as specified.

Signed at the city of New York, New York county, in the State of New York, this 19th day of November, one thousand nine hundred and thirteen.

GEORGE A. CARDWELL.

Witnesses:
CONRAD A. DIETRICH,
JOSEPH G. QUINN, Jr.

Copies of this patent may be obtained for five cents each, by addressing the "Commissioner of Patents, Washington, D. C."